US008005086B2

(12) United States Patent
Zhang et al.

(10) Patent No.: US 8,005,086 B2
(45) Date of Patent: Aug. 23, 2011

(54) PROVIDING AN INDEPENDENT COMPRESSION SERVER WITHIN A NETWORK, AS WELL AS A METHOD, NETWORK STATION AND DHCP SERVER

(75) Inventors: Huan Qiang Zhang, Beijing (CN); Zhi Gang Zhang, Beijing (CN); Chuanming Wang, Beijing (CN); Lin Xiang Cheng, Beijing (CN)

(73) Assignee: Thomson Licensing, Boulogne-Billancourt (FR)

( * ) Notice: Subject to any disclaimer, the term of this patent is extended or adjusted under 35 U.S.C. 154(b) by 358 days.

(21) Appl. No.: 12/086,652

(22) PCT Filed: Dec. 1, 2006

(86) PCT No.: PCT/EP2006/069212
§ 371 (c)(1),
(2), (4) Date: Jun. 17, 2008

(87) PCT Pub. No.: WO2007/071541
PCT Pub. Date: Jun. 28, 2007

(65) Prior Publication Data
US 2009/0135825 A1 May 28, 2009

(30) Foreign Application Priority Data
Dec. 19, 2005 (EP) ..................................... 05292760

(51) Int. Cl.
*H04L 12/28* (2006.01)
(52) U.S. Cl. ...................................................... 370/392
(58) Field of Classification Search ................... 370/392
See application file for complete search history.

(56) References Cited

U.S. PATENT DOCUMENTS

| 5,657,452 | A | * | 8/1997 | Kralowetz et al. | 709/227 |
| 7,398,325 | B2 | * | 7/2008 | Weller | 709/247 |
| 2001/0054101 | A1 | * | 12/2001 | Wilson | 709/225 |
| 2003/0154308 | A1 | * | 8/2003 | Tang et al. | 709/247 |
| 2003/0165162 | A1 | * | 9/2003 | Westphal | 370/477 |
| 2004/0059944 | A1 | * | 3/2004 | Stademann | 713/201 |
| 2004/0062267 | A1 | * | 4/2004 | Minami et al. | 370/463 |
| 2004/0141511 | A1 | * | 7/2004 | Rune et al. | 370/401 |
| 2005/0108431 | A1 | * | 5/2005 | Park | 709/245 |

FOREIGN PATENT DOCUMENTS

| JP | 2002-335181 | 11/2002 |
| JP | 2002335181 | 11/2002 |
| WO | WO 97/09672 | 3/1997 |
| WO | WO 02/10929 | 2/2002 |
| WO | WO 0210929 A1 * | 2/2002 |
| WO | WO 02/093867 | 11/2002 |

OTHER PUBLICATIONS

Patent Abstracts of Japan, vol. 2003, No. 03, May 5, 2003 & JP 2002-335181 (UNICO System KK(See Ref. AC).

(Continued)

*Primary Examiner* — Ayaz R Sheikh
*Assistant Examiner* — Hai-Chang Hsiung
(74) *Attorney, Agent, or Firm* — Robert D. Shedd; Jeffrey M. Navon

(57) ABSTRACT

The invention is related with the problem of utilizing data compression in a network of distributed stations. Often header compression is used to improve the bandwidth usage in networks, in particular wireless networks. Header compression could be implemented in access points or routers, but both implementations have serious problems, e.g. due to limited CPU power, lack of scalability, or handover latency. To resolve the problems the invention proposes to use a dedicated data compression server in the network and a new protocol to transparently deploy data compression in the network.

14 Claims, 7 Drawing Sheets

OTHER PUBLICATIONS

Figure 1:
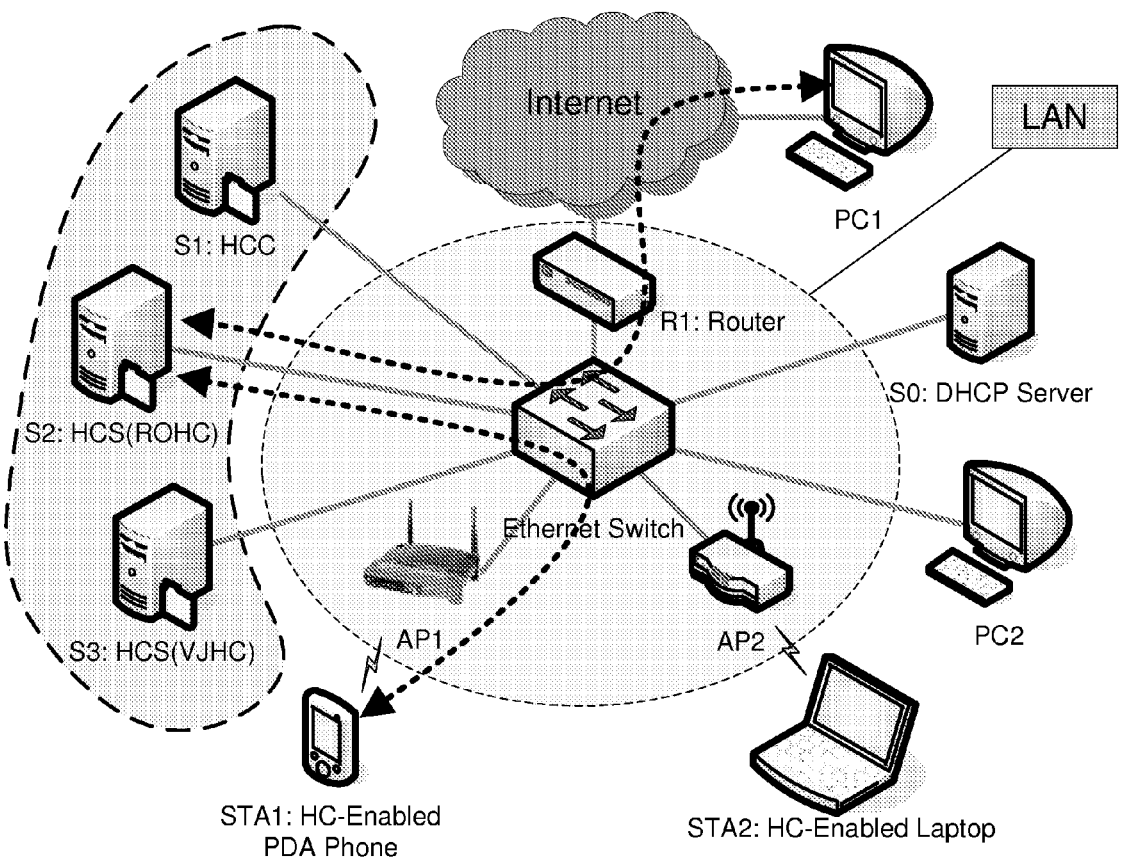

B. Kenel: "A General Purpose Proxy Filtering Mechanism Applied to the Mobile Environment" Wireless Networks, ACM, New York, NY US, vol. 5, No. 5, Oct. 1999, pp. 391-409.

S. Alexander Silicon Graphics et al. DHCP Options and BOOTP Vendor Extensions;, IETF Standard, Mar. 1997, XP015007916, pp. 1-35.

Search Report Dated Feb. 15, 2007.

* cited by examiner

PROVIDING AN INDEPENDENT COMPRESSION SERVER WITHIN A NETWORK, AS WELL AS A METHOD, NETWORK STATION AND DHCP SERVER

This application claims the benefit, under 35 U.S.C.§365 of International Application PCT/EP2006/069212, filed Dec. 1, 2006, which was published in accordance with PCT Article 21(2) on Jun. 28, 2007 in English and which claims the benefit of European patent application No. 05292760.5, filed Dec. 19, 2005.

TECHNICAL FIELD

The invention relates to the field of network communication, in particular computer networks and home networks. More particularly the invention relates to utilizing data compression for the network communication.

BACKGROUND OF THE INVENTION

The technique of header compression created by Van Jacobson also called VJHC algorithm and described in RFC 1144 is well established and used to improve the bandwidth usage in a wireless local area network WLAN. It is a data compression protocol specifically designed to improve Transmission Control Protocol/Internet Protocol TCP/IP performance over slow serial links. The header compression technique reduces the normal 40 byte TCP/IP packet headers down to 3-4 bytes for the average case. It does this by saving the state of TCP connections at both ends of a link and only sending the differences in the header fields that change. In a WLAN, header compression can be implemented in access points AP or routers. Both of these implementations encounter different problems:
1. APs and routers in an existing network may come from different manufacturers, they are based on different operating system platforms OS, and usually have very limited CPU performance, so it may be difficulty to implement header compression in them;
2. Lack of scalability. Because of limited CPU power, the number of header-compression-enabled mobile stations supported in a WLAN will be quite limited, and several header compression protocols can not be deployed simultaneously in the same network;
3. If the header compression is implemented in APs, that will need context transfer when mobile station roaming among a group of APs. This may cause longer handover latency.

INVENTION

To resolve all these problems, this invention proposes to add a data compression server to a network wherein a part of the stations is capable of using data compression for the exchange of data packets while another part is not. The data compression server support utilizing data compression for the transmissions from/to the data compression capable station to/from the non capable station on a part of the transfer path. This has the advantage that the overall data transport capacity in the network is subjectively increased.

Furthermore the invention discloses a new type of protocol called THCDP (Transparent Header Compression Deployment Protocol) and a header compression apparatus to transparently deploy header compression in a network, e.g. a WLAN. This mechanism only needs minor modifications in existing network devices, and will not affect any existing services, and also, it won't prolong the handover latency of roaming mobile stations, and has good scalability.

To achieve transparent deployment of header compression, two types of devices are added into the network: One is a HCC (Header Compression Controller) and the other a HCS (Header Compression Server). HCC will take care of the response to ARP queries (Address Resolution Protocol) for those header-compression-enabled mobile stations, so that the traffic may be intercepted by HCS, which will do header compression/decompression on the packets, and then forward them to the real destination. And also, an output ARP filter module is inserted into the protocol stack of a header-compression-enabled mobile station, so that the transmitted packets can be redirected to HCS to execute header compression. To improve the efficiency, the communication between two nodes which support the same header compression protocol will not be interceded by the HCS, and they will communicate directly with each other.

This architecture also has good scalability. Through the coordination of HCC, different header compression protocols can be applied simultaneously in the same network by using several HCS, and also there can be several HCS for one header compression protocol to balance the load. And HCC and HCS can either reside in different servers or just in one physical server.

FURTHER ADVANTAGES

1. Transparent deployment of header compression in a LAN without modification on any existing network devices;
2. Does not prolong the handover latency of mobile stations;
3. Header-compression-enabled mobile stations can coexist together with those without header compression in a same network;
4. Good scalability, more header compression protocols and more header-compression enabled mobile stations can be supported by simply adding additional HCS into the network.

The invention also relates to a compression server, a network station and a DHCP server.

Further advantageous embodiments of the invention are apparent from the respective dependent claims.

DRAWINGS

Figure 2:
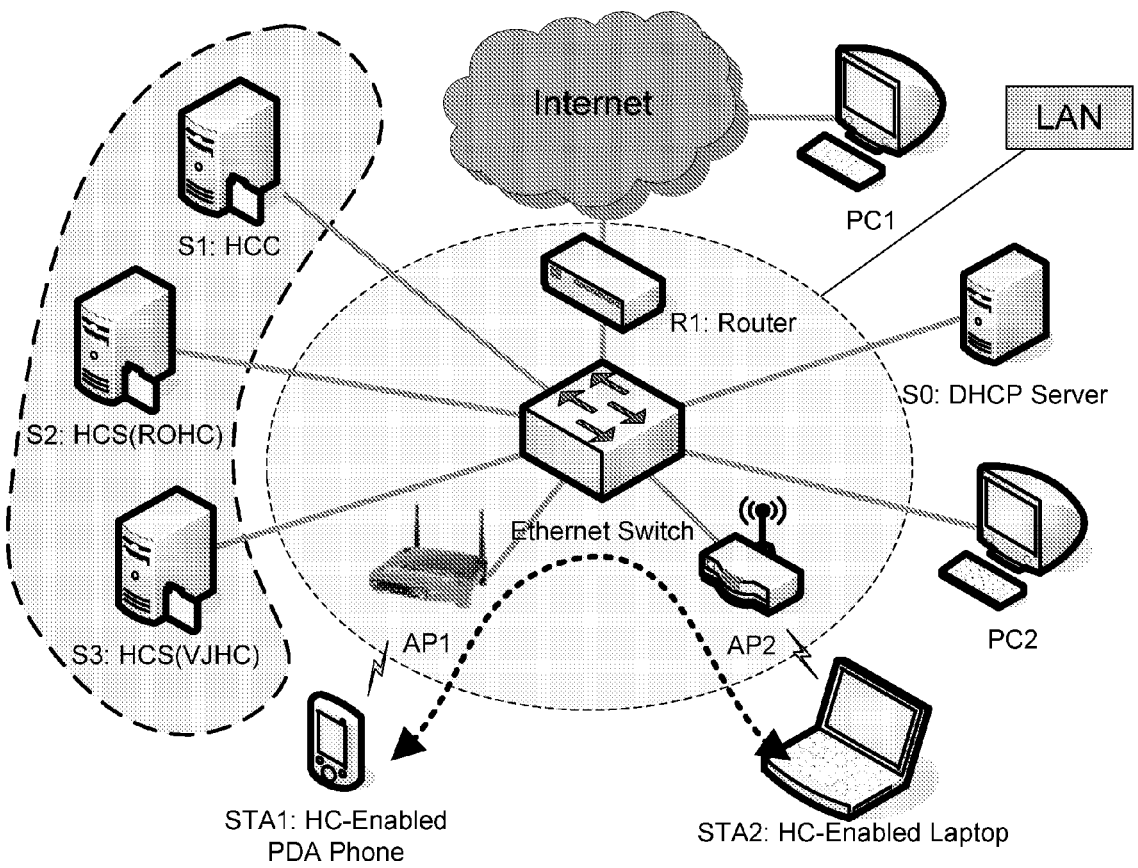
Figure 3:
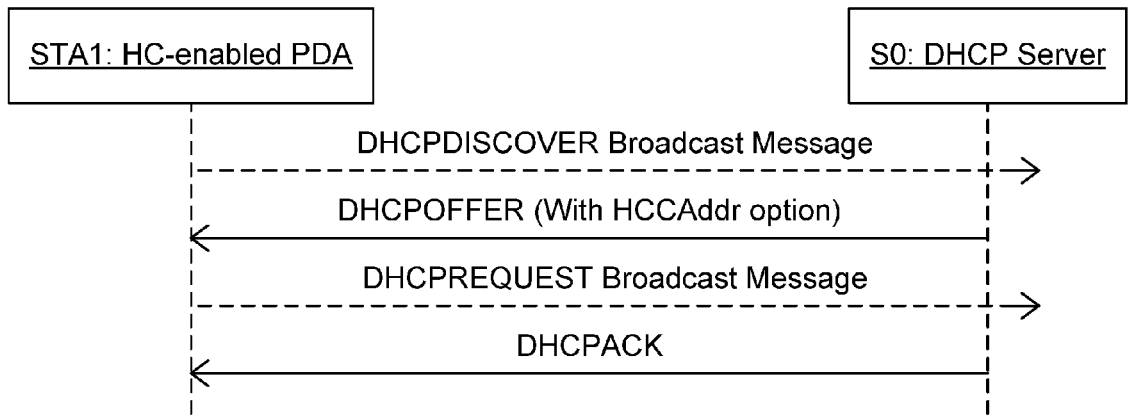
Figure 4:
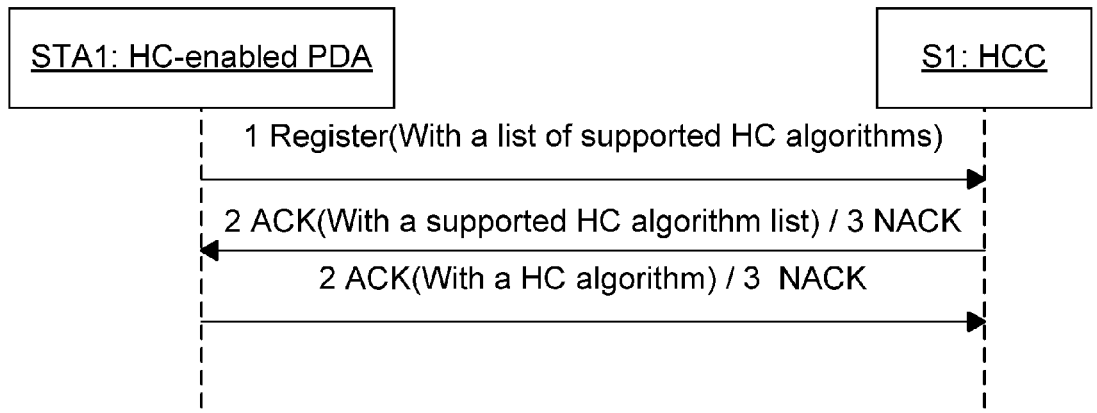
Figure 5:
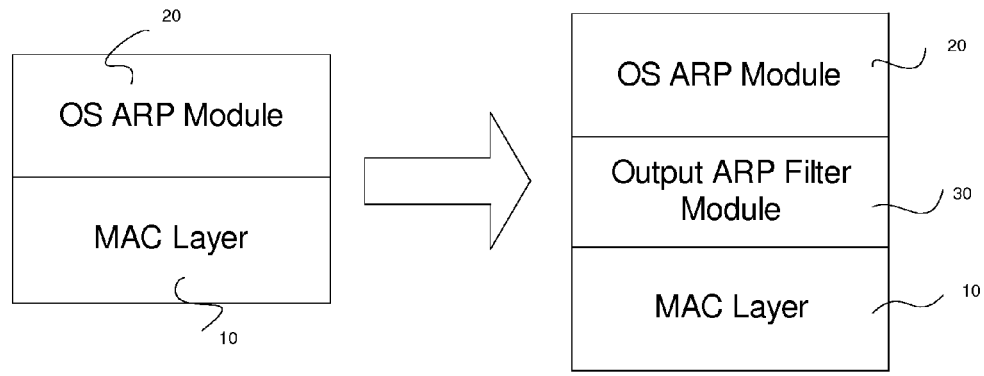
Figure 6:
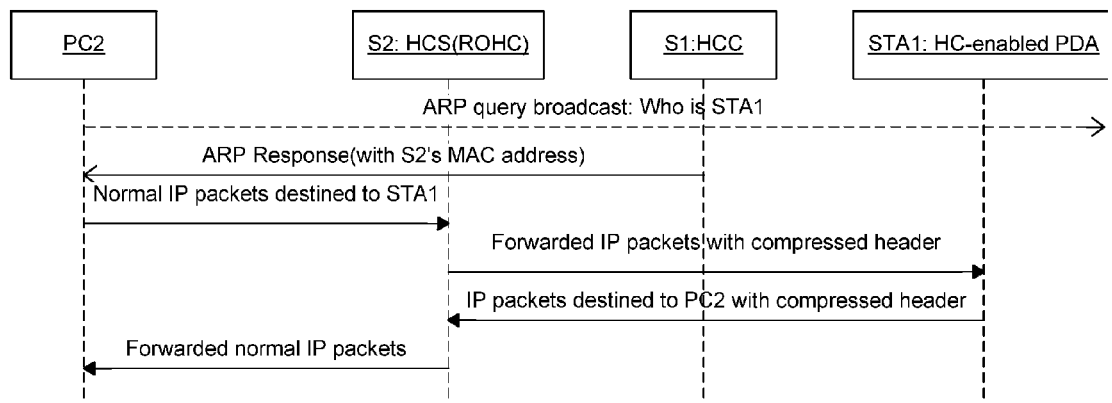
Figure 7:
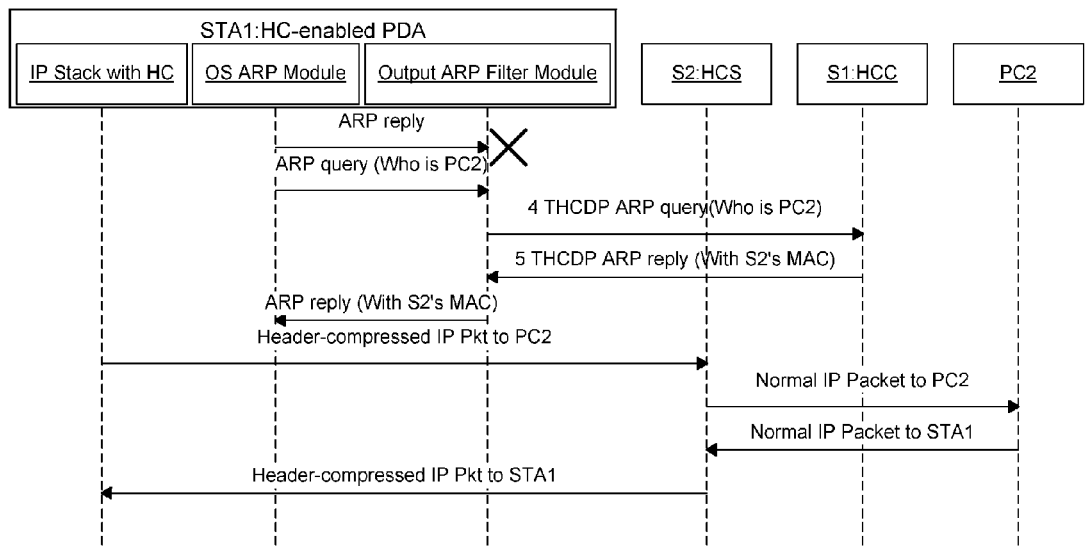
Figure 8:
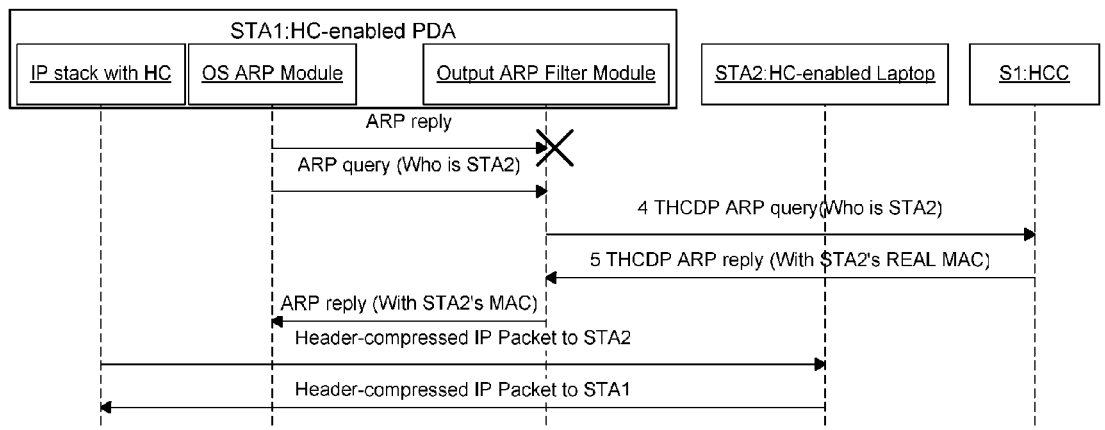
Figure 9:
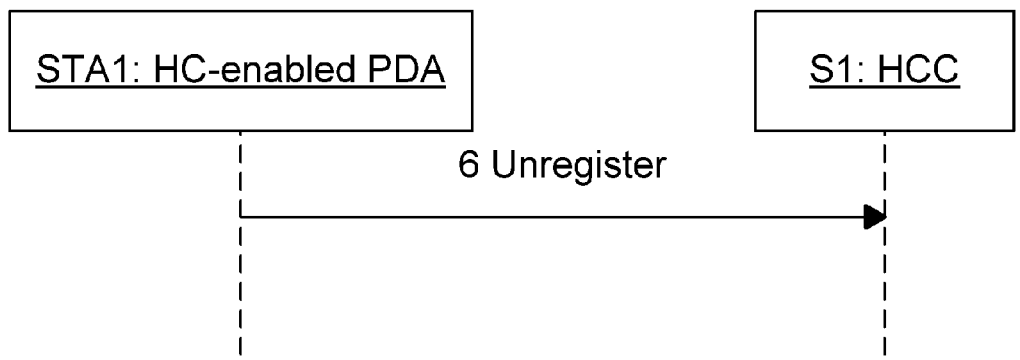
Figure 10:
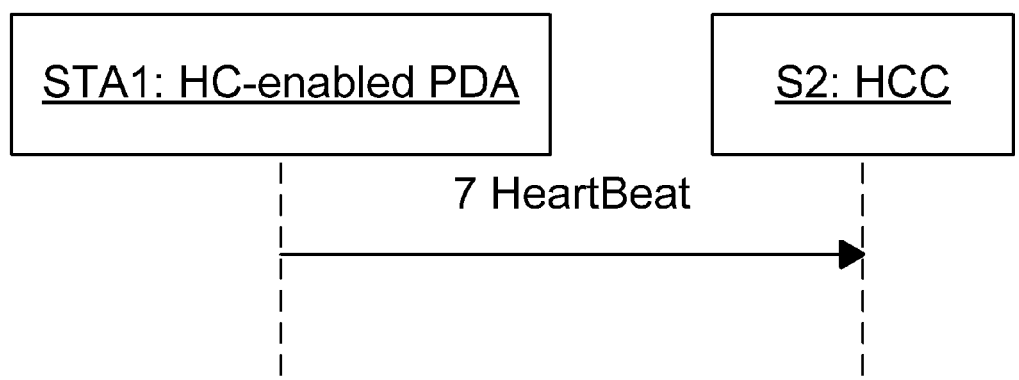

Embodiments of the invention are depicted in the drawings and will be explained hereinafter. The drawings show in:
FIG. 1 the communication between a HC-enabled station and a non-HC-support PC;
FIG. 2 the communication between two HC-enabled stations;
FIG. 3 the message exchange for a HC server address acquirement;
FIG. 4 the registration process;
FIG. 5 the position of the output ARP filter module in a protocol stack;
FIG. 6 the message exchange when a non-HC-enabled node initializes a communication with a HC-enabled node;
FIG. 7 the message exchange when a HC-enabled station initializes a communication with another normal node;
FIG. 8 the message exchange between two HC-enabled nodes;
FIG. 9 Un-register process;
FIG. 10 10 Heartbeat message; and
FIG. 11 11 Message interactions between HCC and HCS;

DETAILED DESCRIPTION OF THE INVENTION

The operations of THCDP protocol will be explained with two examples. FIGS. 1 and 2 show a simple yet typical LAN environment with THCDP header compression support. FIG. 1 shows the scenario of a communication between a HC-enabled personal digital assistant STA1, hereinafter called PDA STA1 and an ordinary non-HC-enabled remote personal computer PC1. FIG. 2 shows the scenario of a communication between two HC-enabled devices PDA STA1 and laptop STA2.

PDA STA1 and laptop STA2 are two mobile stations connected to a local area network LAN through two access points AP1 and AP2, and they may come from different manufactures. PDA STA1 is a HC-enabled PDA phone; STA2 is a HC-enabled laptop. Both of them support the robust header compression protocol—ROHC. The ROHC protocol is described in RFC 3095. PC1 is a remote PC connected to the LAN via Internet and PC2 is a local PC inside the LAN. Both computers PC1 and PC2 may communicate with PDA STA1. R1 is the default router for the whole LAN. S0 is a DHCP server, and S1, S2 and S3 are servers used for the header compression and decompression. For the sake of simplicity, they're illustrated as separate servers, but in a physical network, they may just be logic entities, and reside in the same physical server. Server S1 is called a header compression controller HCC, which coordinates the operation of the server S2 and S3. S2 and S3 are header compression servers HCS. Server S1 has implemented the ROHC compression algorithm while server S2 implements the VJHC algorithm. Servers S2 and S3 will register to HCC S1 to inform it about their header compression abilities.

After the HC-enabled mobile station PDA STA1 roams into a WLAN, and associates with access point AP1, it will get the network configuration from DHCP server S0. Then it will negotiate its header compression ability with HCC S1 through register messages. After a successful registration, HCC S1 will take over the ARP response for PDA STA1, so that any ARP query for PDA STA1 will be replied by HCC S1, either with the MAC address of the selected HCS (e.g. S2), or with the original PDA STA1's MAC address. This depends on whether the ARP query is from a node which supports the same header compression protocol as PDA STA1. If yes (e.g. the ARP query is from laptop STA2, which also supports ROHC header compression as PDA STA1), HCC S1 will answer the ARP query with PDA STA1's original MAC address, so that laptop STA2 and PDA STA1 can make direct communication. If not (e.g. the ARP query is from router R1 for the routed packets from the remote PC1), HCC S1 will answer the query with the MAC address of the selected HCS server (e.g. S2 server's MAC), so that server S2 can intercept the packets, and execute header compression on them.

On the other hand, after having successfully registered to HCC server S1, a filter for output ARP packets will be hooked into the operating system protocol stack of PDA STA1, so that all the output ARP queries and ARP replies will be intercepted. All the ARP replies will be discarded, and any ARP query will incur a THCDP peer-to-peer ARP query sent from PDA STA1 to HCC S1.

The dashed lines in FIG. 1 show the traffic path of a communication between PDA STA1 and PC1. In this scenario, S2 will intercept all the packets, and executes header compression/decompression for packets to/from PDA STA1.

The dashed line in FIG. 2 shows the traffic path of a communication between PDA STA1 and laptop STA2. In this scenario, because both of the two stations support the ROHC header compression protocol, they will communicate directly with each other.

As explained above, there are two types of header compression apparatuses in the network: HCS (Header Compression Server) and HCC (Header Compression Controller). HCS is the server which implements the header compression protocols. HCC coordinates the operation of HCS and deals with register/unregister messages from mobile stations, and also answers ARP requests for those registered mobile stations.

To achieve transparent implementation of header compression, the HCC server S1 takes care of the response to an ARP query from a non-HC enabled station to those HC-enabled mobile stations, and these stations will not answer the ARP query by themselves, so that the packets destined to these mobile stations may be redirected to HCS server S1, S2 to compress the header.

To improve the efficiency, the communication between two nodes which support the same header compression protocol will not be intercepted by the HCS, and they are allowed to directly communicate with each other.

The next section will describe the message interaction of THCDP. There will be a unique identification number used for each type of THCDP message. The messages with the same ID number share the same message format, while their usages vary according to the specific scenario.

Interaction between Mobile Station and HCC Server

From the aspect of a mobile station, the main steps of the THCDP protocol include:
  Acquire the address of HCC;
  Register to HCC;
  Communicate with other nodes;
  Un-register from the HCC;
i) Acquire the Address of HCC Once a mobile station enters a WLAN, it will acquire its IP configurations through the DHCP protocol. The DHCP protocol provides a framework for passing configuration information to hosts on a TCP/IP network. Configuration parameters and other control information are carried in tagged data items that are stored in the "options" fields of the DHCP message. To automatically configure the IP address of HCC in THCDP protocol, a new option field "HCCAddr" is added in the DHCPOFFER message to transfer the IP address of HCC to the mobile station. This is shown in FIG. 3.

ii) Register to HCC

The registration process is shown in FIG. 4. Once the mobile station has acquired the IP address of HCC server S1, and the mobile station supports header compression, then it will send a register message including a list of supported HC algorithms to HCC S1. There's no user authentication during this process, for we take it for granted that user authentication should have been done in WLAN access control (e.g. through IEEE802.1x or some other mechanisms). This is not mandatory and for security reasons further authentication could be added, if needed.

THCDP uses the text-based message format and UTF-8 (8-bit Unicode Transformation Format) encoding, and the messages are transferred through TCP connection. UTF-8 is specified in RFC 3629.

All the messages use the basic format of RFC 2822. A message consists of a start-line, one or more header fields, an empty line indicating the end of the header fields, and an optional message body.

| | |
|---|---|
| THCDP-message = | message-type-line |
| | *message-header |
| | CRLF |
| | [ message-body ] |
| message type line = | THCDP/V1.0 message-type |

The message-type-line, each message-header line, and the empty line must be terminated by a carriage-return line-feed sequence (CRLF). Note, that the empty line must be present even if the message-body is not.

Detailed information for the register message:
Register message
  Message ID: 1
  Description:
  Register message is used by mobile stations to negotiate header compression protocol that will be used in future communication and the parameters of the HC protocol, and it can also be used by HCS servers to register its header compression ability to HCC.
  This message has a body, which contains one or more descriptions of the available header compression protocols.
  Format:

---
THCDP/V1.0 Register
From: x.x.x.x
MessageType: xxx
Content-Type: application/HCDESC
Content-Length: xxx
+<Header compression protocol description>
---

Here, the value for "From" field specifies the source IP address of this message, and the value for "MessageType" field in message header can be HCS_REG or STA_REG, which means that the register message is from a HCS server or a mobile station.

The body of the message is composed of one or more header compression protocol description, and the format of header compression protocol description is as follows:
Name: protocol-name
Parameters: *<para_name=value;>

After receiving a register message from the mobile station, HCC server S1 will send an ACK (acknowledge) packet together with a list of supported header compression protocols to the mobile station. On the other hand, when all the available HCS servers S1, S2 have reached their maximum allowed number of clients, the HCC may send a NACK (not acknowledge) packet back to the mobile station to refuse the header compression request. The same may be done, if HCC finds that none of the requested header compression protocols is supported by any of the HCS servers S1, S2.

The mobile station will never send any header-compressed packets when receiving NACK from HCC. On the other hand, if having received an ACK from HCC, the mobile station will select one header compression protocol and send an ACK to HCC (It can send NACK on some other rare conditions).

Detailed information for the ACK message:
ACK message
  Message ID: 2
  Description:
  ACK message is used by mobile stations or HCC during the negotiation of header compression protocol used and header compression parameters. This type of message also has a message body, which contains a description to the header compression protocol.
  Format:

---
THCDP/V1.0 ACK
From: x.x.x.x
Content-Type: application/HCDESC
Content-Length: xxx
+<Header compression protocol description>
---

Detailed information for the NACK message:
NACK message
  Message ID: 3
  Description:
  NACK message is used by mobile stations and HCC during the registration negotiation.
  Format:

---
THCDP/V1.0 NACK
From: x.x.x.x
Reason: xxxx
---

Here, the value for field "Reason" gives the reason of why a request is refused, it's a normal string.

After a successful registration process, the mobile station and HCC will reach an agreement on which header compression protocol to use, and global parameters of this protocol.

After having successfully registered to a HCC, the mobile station will execute the following operations:
  Hook an output ARP packet filter module 30 into the operating system's protocol stack. This is illustrated in FIG. 5. This module will discard all output ARP reply packets from OS ARP module 20 of the mobile station. When an output ARP query packet from the OS ARP module 20 is received, and the query is for the MAC address of HCC, then this module simply constructs an ARP reply, informing OS ARP module 20 about the real MAC address of HCC. Otherwise, it will send a customized peer-to-peer ARP query (called THCDP ARP query) to HCC, and the HCC will send a THCDP ARP reply. After receiving the reply from HCC, the mobile station will construct a normal ARP reply packet and deliver it to OS ARP module 20;
  Enable header compression;

Detailed information for the THCDP ARP query message:
THCDP ARP query message
  Message ID: 4
  Description:
  THCDP ARP query message is sent from a HC-enabled mobile station to HCC, used by a HC-enabled mobile station to query the MAC address of other nodes;
  Format:

---
THCDP/V1.0 ARPQUERY
From: x.x.x.x
QueryIP: x.x.x.x
---

Here, the value for "QueryIP" field specifies the IP address for which this ARP query is invoked.

And the HCC will execute the following operations after a mobile station has registered to it:
  Add the registered mobile station into a proxy ARP list, this will enable to create proxy ARP responses for this mobile station;
  When a THCDP ARP query message is received from this registered mobile station; it will generate a THCDP ARP reply according to the following situations:
    If the THCDP ARP query message is querying the MAC address of another mobile station which supports the same header compression protocol as this querying station, HCC will send back the queried station's real MAC address;

If the THCDP ARP query message is for some other station, not being capable of performing header compression as queried, then HCC sends the MAC address of the suitable HCS server with that capability back to the querying station.

Detailed information for the THCDP ARP reply message:
THCDP ARP reply message
Message ID: 5
Description:
THCDP ARP reply message, sent from HCC to a HC-enabled mobile station, used to inform a HC-enabled mobile station about the MAC address of other nodes;
Format:

---
THCDP/V1.0 ARPREPLY
From: x.x.x.x
QueryIP: x.x.x.x
MAC: xx:xx:xx:xx:xx:xx
---

Here, the value for "MAC" field is the MAC address for the IP address specified in "QueryIP" field.

Communication with Other Nodes

After registration, the HC-enabled station can communicate with other nodes through header-compressed IP packets.

FIGS. 6 and 7 illustrate the situation of the communication between a HC-enabled mobile station STA1 and another normal node PC2. In this scenario, the two nodes communicate with each other through the HCS server S2. FIG. 6 shows the message interaction when PC PC2 initializes the communication. In this case the PC sends the IP packets uncompressed to HCS S2, which forwards those packets in compressed form to PDA STA1. In the backward direction PDA STA1 sends its packets in compressed form to HCS S2, which performs decompression and forwards them to the PC in uncompressed form. FIG. 7 shows that the reply message to the broadcast ARP query from PC2, see FIG. 6, is blocked in the output ARP filter module 30 of PDA STA1. Further, the ARP query to PC2 generated in OS ARP module 20 of PDA STA1 is intercepted in the output ARP filter module 30 and converted into a THCDP ARP query to PC2. The THCDP ARP reply message is received in output ARP filter module 30 and converted into an ARP reply message with the source address of HCS server S2. This reply message is forwarded to OS ARP module 20. The communication through IP packets is like in FIG. 6.

FIG. 8 depicts the communication between two HC-enabled mobile stations: STA1 and STA2. Supposing both of these nodes support ROHC, then they can communicate with each other directly in compressed form. In this situation, no matter which node starts up the communication, the message interaction is much the same. FIG. 8 shows the scenario when PDA STA1 initializes the communication.

Unregister from the HCC

If the mobile station will no longer need header compression, e.g. when the header compression module is disabled, it should send an Unregister message to the header compression controller S1 to inform it to release resources, see FIG. 9. After this, the HCC will stop answering ARP queries for this mobile station, and the mobile station will invalidate all entries in its ARP tables, so that after this, it can get the real MAC address of the destination nodes according to normal ARP protocol and after that send packets directly to the destinations.

Detailed information for the Unregister message:
Unregister message
Message ID: 6
Description:
Unregister message, sent from HC-enabled mobile station or HCS to HCC to un-register;
Format:

---
THCDP/V1.0 UNREGISTER
From: x.x.x.x
---

Heartbeat Message

To release the resources as soon as possible when a mobile station unexpectedly crashes, the THCDP protocol requires from the mobile stations to report their liveliness by sending HeartBeat messages periodically to HCC. If there's no heartbeat message for a defined time, HCC will take it for granted that the mobile station has crashed or left the current network, and release all the resources related to this mobile station just like receiving an Unregister message.

Detailed information for the ACK message:
Heartbeat message
Message ID: 7
Description:
Heartbeat message is sent from HC-enabled mobile station or HCS to HCC to inform their liveliness;
Format:

---
THCDP/V1.0 HEARTBEAT
From: x.x.x.x
---

Interaction between HCC and HCS

Figure 11:
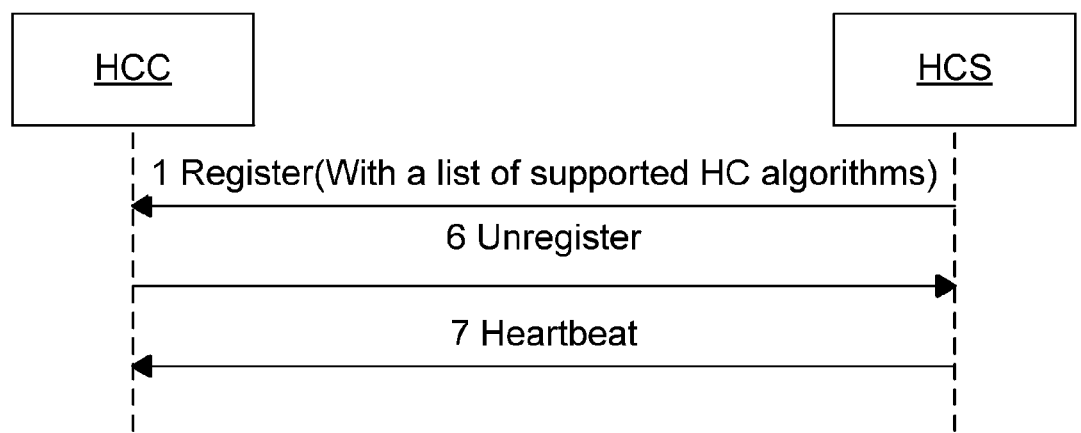

Besides the interactions between mobile station and HCS, HCS also need to report to HCC about its existence and header compression ability, so that the HCC can redirect the register request from mobile station to the appropriate HCS. This is done through Register, Unregister and periodic Heartbeat messages as illustrated in FIG. 11.

The invention is not restricted to the use of header compression in a network. The invention relates to utilizing data compression in general in a network for bandwidth optimization.

| Table of used abbreviations | |
|---|---|
| ACK | Acknowledge |
| AP | Access Point |
| ARP | Address Resolution Protocol |
| CPU | Central Processing Unit |
| CRLF | Carriage Return Line Feed |
| DHCP | Dynamic Host Configuration Protocol |
| HC | Header Compression |
| HCC | Header Compression Controller |
| HCDESC | Header Compression Description, a string value in Content-Type field of THCDP header. |
| HCS | Header Compression Server |
| ID | Identification |
| IP | Internet Protocol |
| MAC | Medium Access |
| NACK | Not Acknowledge |
| PC | Personal Computer |
| PDA | Personal Digital Assistance |
| RFC | Request For Comment |
| ROHC | Robust Header Compression |
| STA | Station |
| TCP | Transmission Control Protocol |
| THCDP | Transparent Header compression Deployment Protocol |

| Table of used abbreviations | |
|---|---|
| UTF-8 | 8 Bit Unicode Transformation Format |
| VJHC | Van Jacobson Header Compression |
| WLAN | Wireless Local Area Network |

The invention claimed is:

1. Method for the exchange of data packets in a network of distributed stations, wherein a part of the stations is supporting header compression for the exchange of data packets while another part is not, wherein one or more header compression servers are added to the network, which support utilizing transparent header compression for the transmissions from/to the header compression-enabled station to/from the non-compression enabled station on a part of the transfer path, wherein the at least one header compression server is separate from a switching or routing device and a compression-enabled station registers to the header compression server in a registration process, wherein for requests on a destination address of the compression-enabled stations and its responses, an Address Resolution Protocol—ARP is used, wherein the at least one header compression server sends a response packet to the request on the destination address of the compression-enabled station, with the header compression server's own address in case the request came from a non-compression enabled station, wherein the compression-enabled station activates an ARP-filter module in a protocol stack after the registration process, wherein the filter module blocks response packets to requests on the destination address of the compression-enabled station from other network stations coming from a protocol layer above the filter module, wherein the header compression server receives data packets from the non-compression-enabled station in uncompressed form, compresses them and sends them out to the compression-enabled station in compressed form.

2. Method according to claim 1, wherein the header compression server receives data packets from the compression-enabled station in compressed form, decompresses them and sends them out to the non-compression-enabled station in uncompressed form.

3. Method according to claim 1, wherein the compression-enabled station lists its compression capabilities in a registration message of the registration process.

4. Method according to claim 3, wherein the header compression server lists its compression capabilities in an acknowledge message after receiving the registration message from the compression-enabled station.

5. Method according to claim 3, wherein the compression-enabled station selects a compression algorithm and sends an acknowledge message back to the header compression server with the information which compression algorithm has been selected for data compression.

6. Method according to claim 1, wherein, if the compression-enabled station itself generates a request on the destination address of another station, the ARP-filter module converts this request into a query to the header compression server and wherein the header compression server sends back the destination address of the header compression server himself, in case the request was directed to a non-compression-enabled station, wherein the header compression server sends back the destination address of the other station, in case the request was directed to a compression-enabled station, and wherein the filter module generates a response to the protocol layer above the filter module with either the destination address of the header compression server or the destination address of the other station, wherein for the requests to the destination address of another network station and the responses to such requests messages according to the Address Resolution Protocol—ARP are used.

7. Method according to claim 1, wherein a station periodically sends liveliness messages to the header compression server, and if a liveliness message from a station is overdue for a certain amount of time, the header compression server releases resources allocated to a mobile station.

8. Method according to claim 1, wherein the network is an Internet Protocol—IP network and if a station enters the network and gets its IP address using Dynamic Host Configuration Protocol—DHCP, a DHCP server sends an offer of an IP address to the station inclusive the compression server's IP address in an optional field of a DHCPOFFER message.

9. Method according to claim 1, wherein the header compression relates to header compression of the data packets.

10. Method according to claim 1, wherein the header compression algorithms correspond to "van Jacobson Header Compression"—VJHC or "Robust Header Compression"—ROHC.

11. Header compression server for the use in a method according to claim 1, wherein the compression server includes means for transparent header compression and comprises a separate controller unit, which is responsible for dealing with control communication from and to the other network stations including generating request messages and response messages regarding address information, information according to the Address Resolution Protocol—ARP, and further comprising means for sending a response packet to the request on the destination address of the compression-enabled station, with the header compression server's own address in case the request came from a non-compression enabled station.

12. Header compression server according to claim 11, wherein the header compression server comprises a separate header compression unit for each compression algorithm it has implemented.

13. Network station for use in a method according to claim 1, wherein the station is capable of using header compression for the exchange of data packets wherein, the station comprises an ARP-filter module as part of a protocol stack, wherein the ARP-filter module blocks ARP-response packets to ARP-requests on the destination address of a compression-enabled station from other network stations coming from a protocol layer above the filter module, wherein the ARP-filter module is activated in a protocol stack after registration of the network station to a header compression server and inactivated after the station unregisters from the header compression server.

14. Network station according to claim 13, wherein, the ARP-filter module comprises means for converting the request on the destination address of another station, into a query to the header compression server if the compression-enabled station itself has generated the request, and wherein the ARP-filter module has means for generating a response to the protocol layer above the ARP-filter module with either the destination address of the header compression server or the destination address of the other station, depending on which destination address the ARP-filter module has received back from the header compression server.

* * * * *